(12) United States Patent
Heiner et al.

(10) Patent No.: US 7,315,514 B2
(45) Date of Patent: Jan. 1, 2008

(54) BANDWIDTH ESTIMATION

(75) Inventors: Andreas Petrus Heiner, Espoo (FI); Jussi Penttinen, Espoo (FI)

(73) Assignee: Nokia Corporation, Espoo (FI)

( * ) Notice: Subject to any disclaimer, the term of this patent is extended or adjusted under 35 U.S.C. 154(b) by 822 days.

(21) Appl. No.: 10/311,933

(22) PCT Filed: Jun. 19, 2001

(86) PCT No.: PCT/EP01/06954

§ 371 (c)(1), (2), (4) Date: Sep. 5, 2003

(87) PCT Pub. No.: WO01/99340

PCT Pub. Date: Dec. 27, 2001

(65) Prior Publication Data

US 2004/0037231 A1  Feb. 26, 2004

(30) Foreign Application Priority Data

Jun. 21, 2000  (GB) .................................. 0015229.8

(51) Int. Cl.
*H04L 1/00*  (2006.01)

(52) U.S. Cl. ............... 370/230; 370/252; 370/338; 370/468

(58) Field of Classification Search ........... 370/252, 370/229, 230, 230.1, 231, 232, 233, 234, 370/235, 253, 395.21, 395.41, 422, 468, 370/338
See application file for complete search history.

(56) References Cited

U.S. PATENT DOCUMENTS 5,155,422 A * 10/1992 Sidman et al. ............ 318/560
5,276,677 A * 1/1994 Ramamurthy et al. ...... 370/232
5,359,593 A * 10/1994 Derby et al. ............... 370/234

(Continued)

FOREIGN PATENT DOCUMENTS

EP  0 720 414 A  7/1996

(Continued)

OTHER PUBLICATIONS

Williamson et al, "Loss-Load Curves: Support for Rate-Based Congestion Control in High-Speed Datagram Networks", Computer Communications Review, US, Association for Computing Machinery, New York, vol. 21, No. 4, Sep. 1, 1991.

*Primary Examiner*—Ricky Q. Ngo
*Assistant Examiner*—Gary Mui
(74) *Attorney, Agent, or Firm*—Squire, Sanders & Dempsey L.L.P.

(57) ABSTRACT

A bandwidth estimation in a resource of a data communication system. After a data unit in a data flow has been received, a recent pulse density for the data flow over a period that includes the received data unit and starts from a time point that precedes the received data unit in the flow is computed. An overall pulse density is computed based on the computed recent pulse density and a previous overall pulse density computed earlier for the data flow. The computation of the overall pulse density is based on values of the computed recent pulse density and the previous overall pulse density. The values are weighted relative to each other. The used bandwidth is estimated based on the weighted overall pulse density.

38 Claims, 4 Drawing Sheets

U.S. PATENT DOCUMENTS

| | | | | |
|---|---|---|---|---|
| 5,646,943 A | * | 7/1997 | Elwalid | 370/230 |
| 5,815,492 A | * | 9/1998 | Berthaud et al. | 370/234 |
| 6,011,776 A | * | 1/2000 | Berthaud et al. | 370/232 |
| 7,039,138 B2 | * | 5/2006 | Patel et al. | 375/350 |
| 7,130,268 B2 | * | 10/2006 | Mascolo | 370/232 |
| 2002/0044528 A1 | * | 4/2002 | Pogrebinsky et al. | 370/230 |
| 2002/0126624 A1 | * | 9/2002 | Martija et al. | 370/252 |
| 2002/0133614 A1 | * | 9/2002 | Weerahandi et al. | 709/237 |

FOREIGN PATENT DOCUMENTS

| | | | |
|---|---|---|---|
| WO | WO 02/069580 | * | 9/2002 |

* cited by examiner

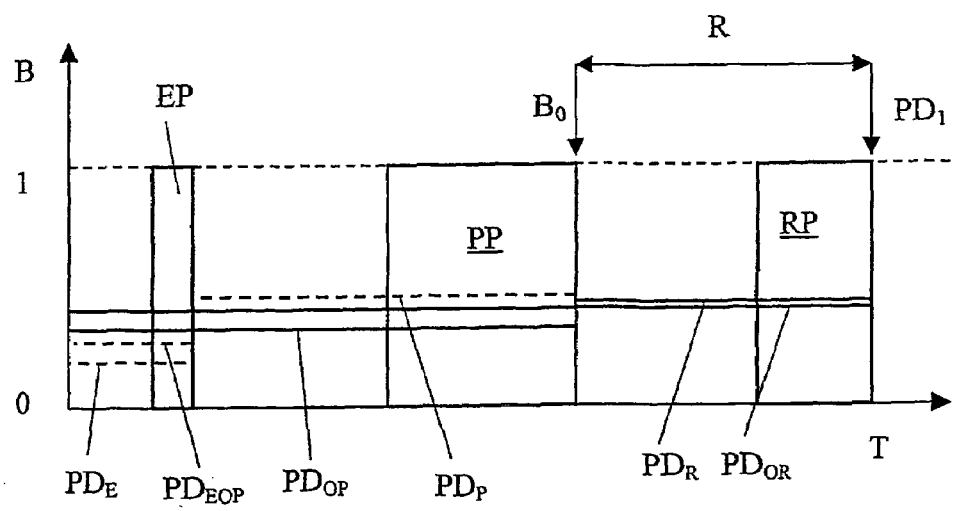
Fig. 4
Fig. 5
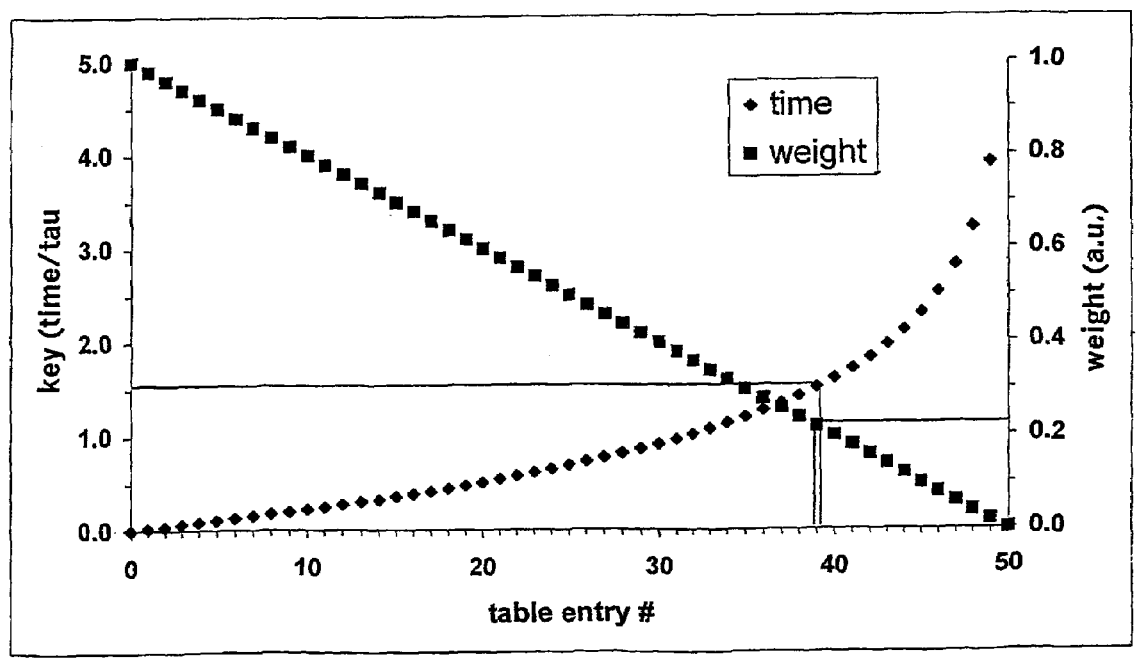

BANDWIDTH ESTIMATION

FIELD OF THE INVENTION

The present invention relates to bandwidth estimation in a communication system.

BACKGROUND OF THE INVENTION

Communication systems are known by a skilled person. A communication system may provide the user, or more precisely, user equipment or terminal, with connection-oriented communication services and/or connectionless communication services. An example of the first type is a circuit switched connection where a circuit is set-up with call set-up and admission control. An example of the connectionless communication services is a so called packet switched service that is typically used in communication that is based on the Internet Protocol (IP). Both of the circuit switched and the packet switched services can be used for communicating packet data. Packet data services can be defined in general as services that are capable of transporting data units (data packets or similar data entities of fixed or variable length) between two signalling points, such as between two terminals or other nodes of the communication system.

In the connectionless services no circuit is set up, but each data entity itself contains an address. Upon arrival of the data entity in a node the address thereof may be looked-up in a table in the node, and the data entity is transported in the next hop to an address that corresponds to that address entry in the table. Instead of hops, in the circuit switched connections the nodes typically maintain information of how to route/switch each packet belonging to that flow.

The circuit switched networks often have fixed-length packets called cells whereas packet-switched networks carry data units of variable length (e.g., the IP). However, there are also data networks that carry variable length data units in a connection-oriented architecture, such as Multi Protocol Labeled Switched (MPLS) networks.

A network that is capable of transporting data units or data entities between two or more nodes is referred to in the following as a data network. The data network may be a communication network that is based on use of a fixed line or wireless communication media. The wireless connection may be used only for a part of the connection between the two nodes. Examples of data networks, without limiting this disclosure to these, include ATM (Asynchronous Transfer Mode), IP (Internet Protocol) and Local Area Networks (LAN). Examples of communication networks that are capable of providing wireless services, such as IP (Internet Protocol) or ATM/AAL2 (Asynchronous Transfer Mode/ATM Adaptation Layer-type 2) based packet data transmissions, include, without limiting to these, the GSM (Global System for Mobile communications) based GPRS (General Packet Radio Service) network, EDGE (enhanced data rate for GSM evolution) Mobile Data Network and third generation telecommunication systems such as the CDMA (code division multiple access) or TDMA (time division multiple access) based $3^{rd}$ generation telecommunication systems that are sometimes referred to as Universal Mobile Telecommunication System (UMTS), and IMT 2000 (International Mobile Telecommunication System 2000). All these relate to the transfer of data to and from mobile stations or similar user equipment providing the user thereof with a wireless interface for the data transmission.

A data transmission system and/or the usage thereof can be managed based on several different principles. For example, the usage of the resources of the system may be charged based on counts of the transferred bits, data packets or other units. Schemes such as "charging in the Internet" can be referred to as arrangements which may require the counting of the amount of data that has been transferred. The charging may also be based on a flat fee charging scheme. A monthly flat fee that is charged regardless the actual usage of the resources is an example of the flat fee charging. The charging scheme may also be a combination of several different charging possibilities. In addition to charging, the management includes various other functions such as congestion control, resource management (e.g. resource allocation), configuration of nodes, higher-level management functions such as SLA-verification. Other examples of management operations that are based on traffic flow estimates include multipath routing and load distribution (i.e. data units belonging to a flow between origin and destination may be transferred via different paths, depending on the traffic load on a link), or Differentiated Services (DiffServ) mechanisms such as SIMA (Simple Integrated Media Access) where packets are marked according to utilized bandwidth and usage agreements.

The above aspects, which may be summarised in so called 'policy-enabled networking', may require amongst others a smooth estimate of the utilised bandwidth to enable stable and smooth control of the communication in the system. An accurate estimate of the bandwidth that is used by a process, user or group thereof of the communication system is an important feature of the policy-enabled networking. Although the data communication systems may measure the bitrates for the purposes of traffic control (e.g. access control, traffic priority assignment), the inventors have found that the estimation of bandwidth usage and policy enforcement based on these estimates should be handled separately in the communications system, as they are two different processes. The first process relates to the actual traffic while the latter relates to service provisioning.

An example of the policy-enabled networking is Quality of Service (QoS) provisioning using the so called 'DiffServ' architecture. 'DiffServ' refers to the IP Differentiated Service architecture, where QoS provisioning is obtained by marking of data units. Different marked packets will receive a different priority in queuing and/or scheduling of nodes (so-called Per-hop-behaviour). The marking may dynamically depend on a time-averaged estimate of the data flow. Examples of other functions that may be included in the policy management include features such as configuration management, traffic shaping, congestion control, service level agreement verifications and so on.

A specific example of a DiffServ scheme that is based on the time-averaged estimate of the data flow is so called SIMA (Simple Integrated Media Access) method. However, the inventors have found that the prior art proposals, such as the SIMA bandwidth estimator, may not provide accurate enough estimate of the used bandwidth. In addition, estimation methods such as the SIMA bandwidth estimation may require numerous ad-hoc settings. The SIMA bandwidth estimator is not scalable either and cannot be applied in a distributed manner. A difficulty in estimating the bandwidth is due to the fact that the underlying process, i.e. transportation of data packets or other data entities, is a stochastic process. In other words, in the packet data networks the length of data packets, the amount of data packets and the distance between the subsequent data packets are random variables. Furthermore, for connectionless networks the underlying process is not only not time invariant, i.e. non-stationary, it may be even chaotic in nature. Although the SIMA proposal may work reasonably well in networks that are based on modes such as the asynchronous transmission mode (ATM), the SIMA method may not provide satisfying results in data communication systems that may communicate data with variable packet lengths.

Multipath routing may also be difficult to employ at present as sudden changes in traffic estimates on different links may cause route flaps (sudden changes between two alternate paths). The flaps are at present considered as one of the major causes for network instabilities and may result in inefficient network utilization. Another disadvantages of the methodology presently used in traffic estimates include ad-hoc setting of parameters, discontinous or ill-defined usage estimates that may prevent deployment of predictive network control algorithms such as multipath routing, and non-additivity of the algorithm which may prevent easy and scalable deployment in distributed environments.

SUMMARY OF THE INVENTION

It is an aim of the embodiments of the present invention to address one or several of the above problems.

According to one aspect of the present invention, there is provided a method for estimating the bandwidth used in a resource of a data communication system, comprising: communicating a data flow through the resource, said data flow containing a plurality of data units; computing a recent pulse density for the data flow over a period that includes a data unit and starts from a time point that precedes the data unit in the flow; computing an overall pulse density based on said computed recent pulse density and a previous overall pulse density computed earlier for the data flow, the computation being based on values of the computed recent-pulse density and the previous overall pulse density that are weighted relative to each other; and estimating the used bandwidth based on the weighted overall pulse density.

According to another aspect of the present invention there is provided a bandwidth usage estimator for estimating bandwidth used in a resource of a data communication system, wherein data units are communicated through said resource in data flow, comprising: means for computing a recent pulse density for the data flow over a period that includes a data unit and starts from a selected point in the flow; means for computing an overall pulse density based on said computed recent pulse density and a previous overall pulse density computed earlier for the data flow; means for weighing the values of the computed recent pulse density and the previous overall pulse density relative to each other; and means for estimating the used bandwidth based on the weighted overall pulse density.

A data communication system may be provided with one bandwidth usage estimator. In a distributed arrangement the data communication system is provided with at least two estimators.

The embodiments of the invention may provide a method and arrangement for measuring the traffic from or to a user or several users. The embodiments may facilitate a better awareness of the flow in network equipment. The embodiment may provide an average bitrate that may be used for policing the traffic. The estimates may used when managing the traffic, for example for congestion control, load distribution or multipath routing. The embodiments may also be used in the provision of services with differently defined quality characteristics for different users. The embodiments are independent of the transport technology (packet-based or cell-based) or network architecture (connection oriented or connectionless). The embodiments may permit stable and non-oscillating control of network resources based on measured traffic load or any other time-dependent network property that can be measured. The embodiments may be applied in a centralized or distributed fashion without affecting the overall traffic estimate used by a process or user, or the policy based on that. The embodiments may not be used to change the actual traffic flow (e.g., by modifying the TCP-backof control mechanism), but they may be rather used to improve the awareness of the flow upon which policy execution can be based. The embodiments may also provide a computationally simple solution for continuous bandwidth estimation.

BRIEF DESCRIPTION OF DRAWINGS

For better understanding of the present invention, reference will now be made by way of example to the accompanying drawings in which:

FIG. 4 shows a schematic example of various pulse densities computed during a continuous bandwidth estimation procedure;

FIG. 5 shows a look-up table;

DESCRIPTION OF PREFERRED EMBODIMENTS OF THE INVENTION

Figure 1:
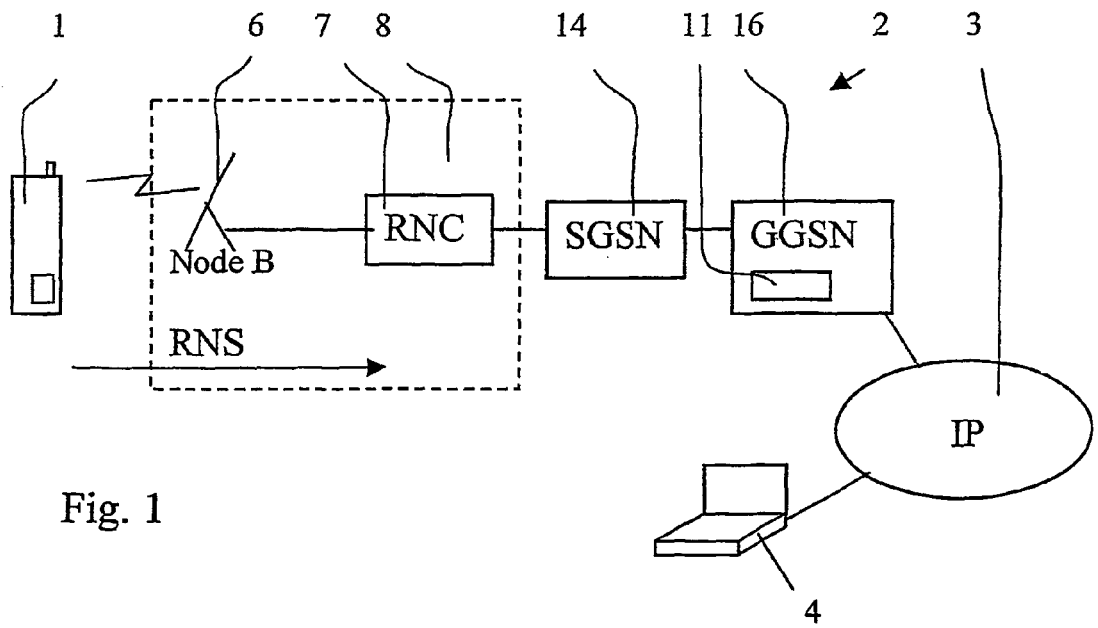
FIG. 1 shows one embodiment of the present invention.

Reference is first made to FIG. 1 which shows a communication system that provides data communication resources and in which the embodiments of the present invention may be employed.

The FIG. 1 communication system is capable of providing wireless data transportation services for a user 1 thereof by means of a public land mobile network (PLMN) 2, which may be a UMTS network or may be simply referred to as a data network. Another user 4 is provided with fixed line data services by means of a connectionless data network 3. An example of a data network environment where the invention may be applied is a server network where data is retrieved from different servers. It should be appreciated that while the embodiments of the invention are described in the context of a UMTS (Universal Mobile Telecommunications System) and a GPRS (General Packet radio Service) and an Internet Protocol (IP) network, the embodiments of the present invention are applicable to any packet- and cell switched/routed network, independent of transport layer technology, and independent of the architecture (connection-oriented or connectionless) of the system.

The elements of a UMTS network system 2 will now be discussed briefly to clarify the operation thereof. A mobile station or other appropriate user equipment 1 is arranged to communicate via the air interface with a transceiver element 6 of an access entity of the PLMN system. It should be appreciated that the term mobile station is indented to cover any suitable type of wireless user equipment, such as portable data processing devices or web browsers. The term base station will be used in this document to encompass all elements which transmit to and/or receive from wireless stations or the like via the air interface.

The base station 6 is controlled by a radio network controller RNC 7. The radio network controller RNC and the base station belong to a radio network subsystem RNS 8 of a radio access network RAN (e.g. a UTRAN: UMTS Terrestrial RAN). It should be appreciated that a UMTS radio access network is typically provided with more than one RNC; and that each radio network controller is arranged generally to control more than one base station 6 although only one base station is shown in FIG. 1. The radio network subsystem 8 is connected to the core network of the PLMN system, e.g. to a SGSN (serving GPRS support node) 14. The SGSN 14 keeps track of the mobile station's location and performs security functions and access control. The SGSN 14 is connected to a GGSN (gateway GPRS support node) 16. The GGSN 16 provides interworking with the other data network 3. In other words, the GGSN 16 acts as a gateway between the UMTS network 2 and the other data network 3, such as an IP based, data network.

Another user terminal 4 is shown to be connected to the data network 3. The exemplifying arrangement is such that the terminals 1 and 4 may communicate via the data networks 2 and 3. However, it should be appreciated that embodiments of the invention may be applied to other types of data communication arrangements as well, such as to an arrangement where the user 1 (or 4) communicates with an element that is implemented within the network 2 (or 3) or to an arrangement where two elements of the network 2 (or 3) communicate data internally within the network.

Although not shown, the data communication system of FIG. 1 may also be connected to conventional telecommunication networks, such as to a GSM based cellular public land mobile network (PLMN) or to a public switched telephone network (PSTN). The various networks may be interconnected to each other via appropriate interfaces and/or gateways.

FIG. 1 shows further a bandwidth estimator and policing unit 11 that is implemented in the GGSN 16. The unit 11 may comprise an appropriate hardware such as a microprocessor or any other data processing device capable of processing the required computations and other data processing. The unit 11 may also comprise memory means for storing information required for the processing and/or resulting from the processing. An example of the internal arrangement of the unit 11 is shown in more detail in FIG. 7.

It should be appreciated that the unit may also be located in other elements of the data system, such as in the SGSN14, RNC 7 or even base station 6 (i.e. Node B). In addition, a system may include several estimator and/or policing units. The most suitable place depends on the network topology, but the additive property of the estimation function may secure equal treatment regardless of the location of the unit 11, provided placement of the bandwidth estimators is done in a consistent manner.

Figure 2:
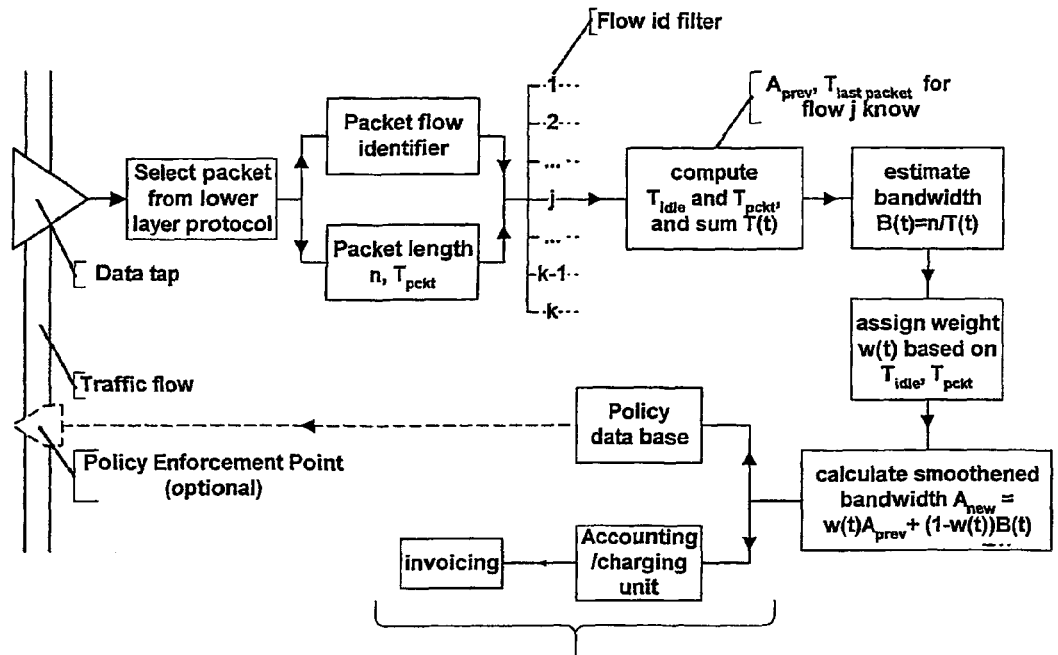
FIGS. 2 and 3 are flowcharts illustrating operation of two embodiments of the present invention.
Figure 3:
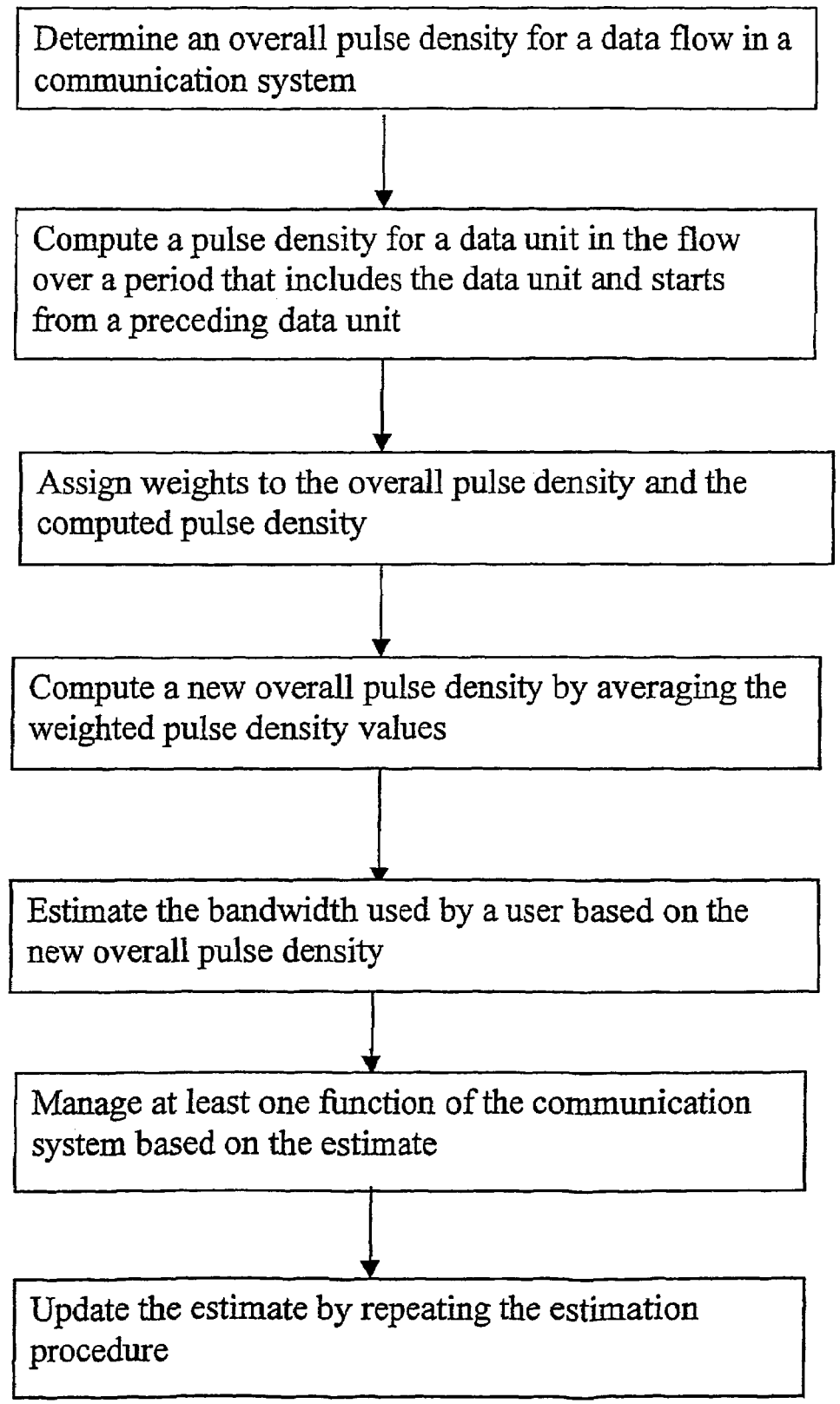

Referring now also to the flowcharts of FIGS. 2 and 3, the following will discuss in more detail embodiments for estimation of the bandwidth usage of a data network resource for the purposes of policy-enabled networking. In the embodiments any measurement of the bit rates for the purposes of the traffic control is preferably a separated process from the policy-enabled enforcement processes. The policy-enabled networking may require a sufficiently smooth estimate of the used bandwidth so as to enable stable and non-oscillatory control functions based on the estimates. To facilitate this, the current bandwidth utilisation may be calculated as a time-average of the recent ratio between the number of bits contained in the most recent packet and the sum of the time periods of the recent packet and the period between the last packet and the most recent packet. Calculation of the bandwidth estimates is event-driven, i.e. the new bandwidth estimate is preferably calculated at the arrival of the new data unit belonging to a specific flow.

The inventors have also found that it is advantageous to have an estimate of a bandwidth such that more weight is given for data communication that is more recent than for data communication that was transported substantially long time ago. In other words, the time-averages that have been computed for a data flow may be weighted such that the more recent time-average values are assigned higher weights than the earlier values.

Before describing exemplifying embodiments of the invention in more detail, some definitions used in this specification will be briefly explained. A (data) packet or other data unit is a sequence of bits that typically is consecutive. In a data unit which the sequence of bits have a well-known interpretation according to the protocol of the data unit. A flow is a sequence of data units such as the data packets that can be considered similar according to a well-known criteria such as source-destination-protocol-ports tuplets (IPv4) or flow identifier (IPv6). The data units in a flow may be consecutive, but this is not a necessity. To-give an example, lets assume that two packets $p_1$ and $p_2$ belong to the same flow. The packets $p_1$ and $p_2$ can be multiplexed with packets q of another flow. The packets $p_1$ and $p_2$ may also be head to tail in the time domain but are still distinguishable as two different packets. This means that packet p1 and p2 cannot be considered as one single packet, even though the consecutive bits belong to the same flow. A data entity or unit may have variable (e.g. Internet Protocol data packets) or fixed length (e.g. ATM cells), and thus term data pulse is used in this specification to refer to all data entities.

A reference is now made to the schematic pulse diagram of FIG. 4. In the diagram the horizontal axis denotes time and the vertical axis denotes used bandwidth in scale 0 to 1. Each of the three pulses are shown to use the entire capacity, i.e. 100% of the capacity. It should be appreciated that a data unit may reserve less bandwidth than the shown 100% of the total line capacity. The most recent pulse (RP) in the right hand side is shown to reserve a certain amount of bandwidth resources. The reserved resource is averaged i.e. distributed over a period R that has lapsed since the end of the preceding pulse (PP) at $B_0$. The averaged bandwidth is referred to in this specification as pulse density (PD). The pulse density for the period R is indicated by line $PD_R$.

According to a preferred embodiment the most recent overall weighted pulse density at point $PD_1$ of the flow is computed based on said recent pulse density $PD_R$ and the preceding overall weighted pulse density $PD_{OP}$. The most recent pulse density (designated by $PD_{OR}$ in FIG. 4) is an average of said recent pulse density $PD_R$ and said preceding overall weighted pulse density $PD_{OP}$ and is thus positioned between the two values, the actual location depending the weighting between the two values, as will be explained below. The preceding overall weighted pulse density has been computed in a similar manner in the preceding bandwidth estimation cycle for a period that ends at the right hand edge of the preceding pulse (PP), i.e. at Bo. The most recent pulse density used in said preceding bandwidth estimation cycle is designated by dashed line $PD_P$. The earlier overall weighted pulse density for said preceding bandwidth estimation cycle is designated by dashed line $PD_{EOP}$. An earlier pulse density $PD_E$ has been computed earlier for the earlier pulse (EP) on the left hand side of the diagram. This earlier pulse density has been used in the previous rounds of bandwidth estimation, and has influence over the value of the preceding overall pulse density $PD_{OP}$. Thus the earlier pulse density $PD_E$ will also be taken into account when computing the latest overall pulse density $PD_{OR}$ for the most recent pulse or data unit RP.

The recent pulse density $PD_R$ and said preceding overall pulse density $PD_{OP}$ may be assigned with weights such that the resulting overall weighted pulse density $PD_{OR}$ reflects better the amount of bandwidth that is currently reserved at the resource. The $PD_R$ value reflects the most recent situation, while historical information is taken into account by means of said $PD_{OP}$ value in order to provide a recursive estimate. The weighting can thus be used to "adjust" the balance between the more recent and long term situation.

The above described embodiment is advantageous in that both the most recent situation and the history information can be taken into account when producing an estimate of the used bandwidth, while keeping the computations as simple as possible. The preceding overall pulse density value includes long term history information while the most-recent pulse density value includes an indication of the most recent bandwidth usage. By means of selecting appropriate weighing parameters it is possible to optimise the importance of the long term value.

The process is preferably continuous and may be repeated whenever required. The process provides a fast, computationally effective and recursive way of obtaining an update of the used bandwidth in a resource. It should be appreciated that one pulse density computation period may include more than one pulse (e.g. pulses RP and PP in FIG. 4). The computation period may not include no pulses at all, i.e. may consist of an idle period.

The overall pulse density computations may be extended to cover only a certain limited amount of earlier pulses. This may influence the recursive nature of the estimation process the above described embodiment provides. To maintain the recursive nature of the estimation process, it is possible e.g. to store information about the history in the resource, e.g. about the earlier pulse densities and/or average pulse density and so on.

The weights may be assigned such that the recent pulse density is given more weight than what is given to each individual previous pulse density. However, although the recent pulse density preferably always has a higher weight than each individual pulse density in the past, the previous overall pulse density may still have a higher weight in some applications.

According to an embodiment of the invention, the calculation is based on use of storage means such as a specific look-up table (see FIG. 5). The look-up table may enable faster computations as the use thereof may reduce the number of the required operations. The look-up table may be implemented within the hardware, i.e. in the policy observer unit 11. The use of look-up tables facilitates fast enough provision of the estimates so that the estimation results may be used in congestion control. The congestion control is an important aspect of systems that require substantially high Quality of Service (QoS).

The use of the look-up table of FIG. 5 be discussed in more detail after the following explanation of the computations on which the embodiments may be based on. The maximum bit rate that may be transferred over a link is denoted in the following by B [bit/sec]). The duration of one bit is denoted by $\Delta t = 1/B$ [sec]. The latter term is for defining time granularity. The instantaneous bit rate of a flow at time t is '0' in absence of a packet and 'B' if a packet is observed. The relaxation time of the measurement is given by $\tau_T$ [sec]. The relaxation time may also be expressed in bits, wherein it can be given as $\tau_B = \tau_T * B$ [bit]. The idle time between the two packets is given by $T_{idle} = m * \Delta t$ [sec]), wherein m is the spacing between the two packets $p_1$ and $p_2$ in bits. The time is measured as the time lapse between two 'no packet'→'packet' (or alternatively 'packet'→'no packet') changes. The packet length is n [bit]. The duration of a packet is given by $T_{pckt} = n * \Delta t$ [sec]. The averaged bit rate at t=0 is $A_0$ [bit/sec].

The time-averaged bandwidth A at time t' (i.e. A(t')) can be expressed as:

$$A(t') = \int_0^{t'} B \cdot f(t) \cdot w(t) \, dt \quad (1)$$

wherein B is the maximum bandwidth,
f(t) is the pulse function describing the packet flow, and
w(t) is a normalised but otherwise arbitrary weighing function.

The total data volume sent (D in the equation 2 below) should be the same irrespective of the measurement method (i.e., regardless whether a direct or a time-averaged method is used).

$$D = \int_0^{t'} A(t) \, dt = \int_0^{t'} \left( \int_0^t B \cdot f(t') \cdot w(t'') \, dt'' \right) dt = \int_0^{t'} B \cdot f(t) \, dt \quad (2)$$

The estimate that is obtained by the above may be called as 'bit-conservative' or 'information-conservative' estimate. The following will consider the derivation of the bit-conservative estimate in more detail.

Lets assume that at $t=t_0$ the previous packet has ended ('packet'→'no-packet' change) and the averaged bit rate is $A_0$ [bit/sec]. A new packet arrives ('no-packet'→'packet' change) after $T_{idle}$ [sec] and has a length of n [bit]. As an example of a weighting function used frequently in memory processes the exponential function is selected. However, any other smooth function that has a converging integral over the interval [0, ∞] can be used. The exponential averaged bit rate at $t'=t_0+T_{idle}+T_{pckt}$ is now:

$$A_{t'} = \int_{t_0}^{t'} \left( (A_0 \delta(t=t_0) + B \cdot f(t)) \frac{e^{-(t'-t)/\tau_T}}{\tau_T} \right) dt \quad (3)$$

where f(t) is the pulse function describing the packet, and $$w(t) \equiv \frac{e^{-(t'-t)/\tau_T}}{\tau_T} \quad (4)$$

is the normalised history function with time t' as its origin. Integration of (3) gives $$A_{t'} = A_0 e^{-(t'-t_0)/\tau_T} + B \int_{t_0+T_{idle}}^{t'} \frac{e^{-(t'-t)/\tau_T}}{\tau_T} dt \quad (5)$$

Equation (5) gives $$A_{t'} = A_0 e^{-(t'-t_0)/\tau_T} + B(e^{-(t'-t')/\tau_T} - e^{-(t'-(t_0+T_{idle}))/\tau_T}) \quad (6)$$

which becomes (by using $t'=t_0+T_{idle}+T_{pckt}$)

$$A_{t'} = A_0 e^{-(T_{idle}+T_{pckt})/\tau_T} + B(1 - e^{-T_{pckt}/\tau_T}) \quad (7)$$

In terms of bits this becomes $$A_{t'} = A_0 e^{-(m+n)\Delta t/\tau_T} + B(1 - e^{-n\Delta t/\tau_T}) \quad (8)$$

As the pulses of the pulse functions $f_i(t)$ for different flows are strictly consecutive and non-overlapping, the sum over all flows of the all averaged bit rates $A_i(t)$ equals the utilised bandwidth for all t values. Similarly, the pulse function $f_i(t)$ can in a distributed environment be thought of as consisting of several non-overlapping functions $f_{ij}(t)$, and the sum over all sub-flows $f_{ij}(t)$ equals $f_i(t)$.

The exemplifying method discussed herein will be referred to as a 'Time Averaged Pulse Density' (TAPD) method. It should be appreciated that in practical implementations it may be that the information of the granularity of a single bit $\Delta t$, or the maximum bandwidth B, are not available for the purposes of obtaining accurate estimates of the time-averaged bitrate A(t). However, the distance between two packets $T = T_{idle} + T_{pckt}$ and the packet length n are typically known. Hence the limited observation granularity may in some applications make the equation (8) interesting from a theoretical point only. However, from the system's point of view the n bits are send over a link with a constant bandwidth B during a time $T_{pckt}(t)$, preceded by an idle time $T_{idle}(t)$. From the user's point of view, the n bits are send over a link with instantaneous bandwidth $B(t) = n/T(t)$, with $T(t) = T_{idle}(t) + T_{pckt}(t)$. This quantity will be referred to in this specification as pulse density (PD). In the latter case the idle time $T_{idle}(t)$ between the two packets is zero. Equation (8) can thus be written as:

$$A_{new} = A_{prev} e^{-(m+n)\Delta t/\tau_T} + \quad (9)$$
$$B(1 - e^{-n\Delta t/\tau_T}) \xrightarrow{m=0} A_{prev} e^{-T_{t'}/\tau_T} + \frac{n}{T_{t'}}(1 - e^{-T_{t'}/\tau_T})$$

The weighted pulse density will be referred to herein as the Time Average Pulse Density (TAPD) method.

A problem may arise with regard to the first packet in the data stream since $T_0$, i.e. the time elapsed since the last packet, may not be properly defined. This can be solved by initialising To to be several times the relaxation time, e.g. such that $T_0 = 4\tau_T$. The effect of the initial bit rate $A_{prev}$ has due to the exponential weighting died out, and it is possible to obtain a current bit rate that is not too small. This formulation can be defined as 'bit-conservative'.

In practice the calculation of the exponents in the equation (9) or equation (8) may be somewhat slow to accomplish. According to a preferred embodiment, a simple lookup table may be used to speed up the computations. The lookup table may contain values $(T_i/\tau_T, W_i)$ with $T_i/\tau_T$ as a key, whereby the speed of calculating the time averaged bit rate may be increased considerably.

FIG. 5 shows an exemplifying look-up table. Logarithmically distributed values in the look-up table may be employed to speed-up the calculation of the weights. The sum of the times $T_{idle}$ and $T_{pckt}$ is divided by the relaxation time $\tau$, and is used as search key (in the left hand side vertical axis) in the table. At least one nearby table entry is selected and the corresponding weight is read from the horisontal axis (table entry). For example, 1.55 in the key axis corresponds index 39 in the horizontal table entry axis and weight 0.22 in the right hand side weight axis. The linear distribution of the weights may guarantee a higher accuracy. It may be advantageous to take several table entries around the selected entry and perform a linear, cubic or gaussian interpolation on the weights. The accuracy may also be increased by means of a higher number of table entries.

Use of logarithmically distributed key values may be used to guarantee the accuracy of the estimate. For $N_{table}$ logarithmically distributed values of $T/\tau_T$ the difference between the actual value and the lookup table value should be at the most $1/N_{table}$. More precise estimates of the weight to be used may be obtained by appropriate interpolation mechanisms such as linear, cubic or gaussian interpolation algorithms. The use of lookup tables may also facilitate hardware implementation with integer calculations by appropriate scaling.

The TAPD-method can be implemented efficiently and without loss of accuracy using a lookup table with logarithmic distributed key values. An integer representation (permitting a hardware implementation in e.g. an FPGA (Field Programmable Gate Array), DR FPGA (Dynamic Reprogrammable FPGA) or ASIC (Application Specific Integrated Circuit) is also possible by means of simple scaling operation. Interpolation mechanisms can be implemented in a similar fashion.

The above discussed Time-Average Pulse Density method for estimating the utilised bandwidth is based on the integral form of the exponential weighted running average of an arbitrary packet stream. The method is a 'bit-conservative' algorithm for any packet flow, independent of the (initial) choices of parameters. The only parameter to be set may be the relaxation time $\tau_T$, which determines the smoothness of the flow. The exact value can be negotiated in a policy, and there is no objection of having different values for different classes of traffic, users or user processes. No simplifying approximations may be needed in the derivation. The method may also permit a simple (recursive) evaluation of any flow, which can be used in traffic shaping. No special arrival process is assumed, and a filter is employed only to the incoming flow. It should be noted though that the flow itself is not affected: merely the "flow-awareness" in the-equipment is influenced. The subscription or another contract between the user and the operator may define a quality or service parameter that is used for charging, assigning values to the Differentiated Service field in an IPv4 packet, or other pre-agreed arrangements.

Figures 6, 7:
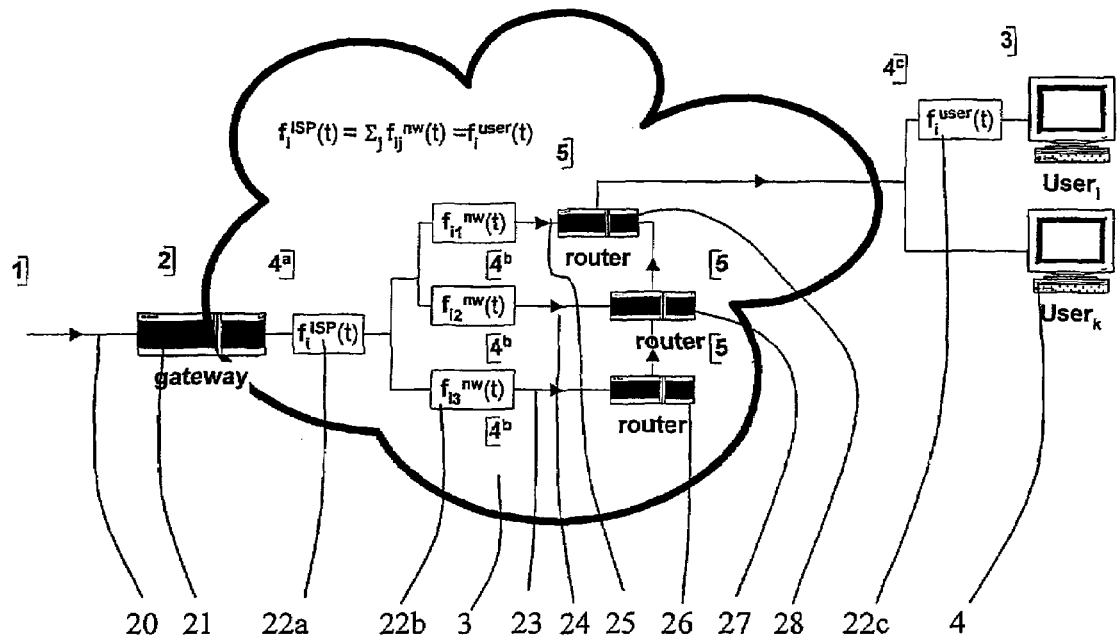
FIG. 6 shows an embodiment that has been implemented in a distributed environment.
FIG. 7 shows a block diagram of an bandwidth estimator.

FIG. 6 shows a further embodiment that is implemented in a data network serving computer terminal users 4. Data is shown flow via a communication path 20 towards a gateway for an ISP (Internet Service Provider) network 3. The data flow 20 is distributed over three possible paths 23 to 25 and via 3 different possible routers 26 to 28, respectively. The policing function may also be distributed between several units on several links 23 to 25. More particularly, the bandwidth estimator function may be implemented by means of centralised estimators 22a and 22c and/or distributed estimators 22b in respective paths. The total observed flow may be determined in a collecting unit (not shown). This embodiment may also enable a quality control by the user. For example, the user may verify at all times whether he/she receives a service level the user is paying for and/or what has been agreed with the service provider.

FIG. 7 shows an example of the bandwidth usage estimator 11. The estimator may be provided with a processor means 31 for computing the recent pulse density ($PD_R$ in FIG. 4) for the data flow over the period (R in FIG. 4) that is to be considered. The estimator 11 comprises further a processor means 32 for computing an overall pulse density ($PD_{OR}$ in FIG. 4) based on said computed recent pulse density and a previous overall pulse density ($PD_{OP}$ in FIG. 4) computed earlier for the data flow. Processor means 33 for weighing the values of the computed recent pulse density and the previous overall pulse density relative to each other are also shown. A processor means 34 is provided for estimating the used bandwidth based on the weighted overall pulse density. It should be appreciated that the above referenced means for computing a recent pulse density, means for computing an overall pulse density, means for weighing the values, and means for estimating the used bandwidth may be implemented by means of a single data processing unit.

The unit 11 may comprise further memory means 35, such as an appropriate database, for storing history information or any other information regarding the.data flow. It should be appreciated that although the database 35 of FIG. 7 is shown to be connected to the processor 34 only, the other processors 31 to 33 may fetch and store information from and to the database as well via a connection over said processor 34.

The bandwidth usage estimation algorithm is additive in nature, and thus the old estimate $A_0$ can be transferred with the handover (hard or soft) to the new base station to be used, and the policy enforcement may continue without discontinuities.

The value of the parameter to be fetched may be based on an agreement that is made between the user of the communication system and a service provider who provides the data communication services for the user, such as an Internet Service Provides (ISP). For example, the relaxation parameter discussed above can be agreed upon between each user (or user process) and the ISP. The agreed individual parameters may be stored in a database. The database may be maintained by the service provider or a third party.

It is noted that the above disclosed solution is applicable to any network architecture (connectionless or connection-oriented), underlying transport protocol (fixed-length or variable-length data units) or transport technology (wired or wireless). The only assumption is that data units can be identified, and that data units can be classified as belonging to different flows. In general, the embodiments may be implemented independently of the type of the used transport protocol. It should also be appreciated that whilst embodiments of the present invention have been described in relation to wireless user equipment, embodiments of the present invention are applicable to any other suitable type of user equipment.

It is also noted herein that while the above describes exemplifying embodiments of the invention, there are several variations and modifications which may be made to the disclosed solution without departing from the scope of the present invention as defined in the appended claims.

The invention claim is:

1. A method for estimating bandwidth used in a resource of a data communication system, comprising:
   communicating a data flow through the resource, said data flow containing a plurality of data units;
   computing a recent pulse density for the data flow over a period that includes a data unit and starts from a time point that precedes the data unit in the flow;
   computing a weighted overall pulse density based on said computed recent pulse density and a previous overall pulse density computed earlier for the data flow, the computing a weighted overall pulse density being based on values of the computed recent pulse density and the previous overall pulse density that are weighted relative to each other; and
   estimating used bandwidth based on the weighted overall pulse density.

2. A method as claimed in claim 1, wherein the period starts from an earlier data unit preceding said data unit in the flow.

3. A method as claimed in claim 2, comprising use of linearly distributed weights.

4. A method as claimed in claim 1, wherein the computing of the pulse densities comprises fetching at least one parameter from storage means.

5. A method as claimed in claim 4, wherein the storage means comprises a lookup table.

6. A method as claimed in claim 4, wherein the at least one parameter is fetched based on relaxation time.

7. A method as claimed in claim 4, wherein the at least one parameter is fetched based on information of past events.

8. A method as claimed in claim 4, wherein the at least one parameter is fetched from the storage means based on a distance between two subsequent data packets.

9. A method as claimed in claim 4, wherein the parameter fetched from the storage means comprises a weight.

10. A method as claimed in claim 4, wherein the at least one parameter is fetched based on a key value, said key value being based on the duration of a received data unit, duration of idle periods in the period and relaxation time.

11. A method as claimed in claim 4, wherein the storage means is implemented in the hardware of a data communication system.

12. A method as claimed in claim 4, comprising use of logarithmically distributed key values for the fetching of the at least one parameter.

13. A method as claimed in claim 4, wherein the value of the parameter to be fetched is based on an agreement between a user of the communication system and a provider of the data communication service.

14. A method as claimed in claim 1, wherein the weighting is based on the timing of different averaging periods used for the computations.

15. A method as claimed in claim 1, wherein a weight assigned to pulse density values reduces with time between subsequent data units.

16. A method as claimed in claim 1, wherein weights are assigned such that the recent pulse density is given more weight than each individual previous pulse density.

17. A method as claimed in claim 1, wherein the bandwidth estimate is used for policy-enabled management of the communication network.

18. A method as claimed in claim 17, wherein the management comprises congestion control.

19. A method as claimed in claim 1, comprising provision of different service levels for different users based on the estimated usage of the bandwidth.

20. A method as claimed in claim 1, wherein the bandwidth estimation is applied in a distributed data communication environment.

21. A method as claimed in claim 1, wherein the bandwidth estimation is applied in a centralized data communication environment.

22. A method as claimed in claim 1, wherein the bandwidth estimation is scalable.

23. A method as claimed in claim 1, wherein the weighted overall pulse density expresses the used bandwidth as seen by a user.

24. A method as claimed in claim 1, wherein the estimate of the used bandwidth is updated by repeating the steps for another data unit, said other data unit being positioned after a received data unit in the flow.

25. A bandwidth usage estimator for estimating bandwidth used in a resource of a data communication system, wherein data units are communicated through said resource in data flow, comprising:
- means for computing a recent pulse density for the data flow over a period that includes a data unit and starts from a selected point in the flow;
- means for computing a weighted overall pulse density based on said computed recent pulse density and a previous overall pulse density computed earlier for the data flow;
- means for weighing the values of the computed recent pulse density and the previous overall pulse density relative to each other; and
- means for estimating the used bandwidth based on the weighted overall pulse density.

26. A bandwidth usage estimator as claimed in claim 25, wherein the means for computing a recent pulse density, means for computing an overall pulse density, means for weighing the values, and means for estimating the used bandwidth are implemented by means of a data processing unit.

27. A bandwidth usage estimator as claimed in claim 25, further comprising memory means for storing history information regarding the data flow.

28. A bandwidth usage estimator as claimed in claim 25, wherein operation thereof is recursive.

29. A bandwidth usage estimator as claimed in claim 25, wherein the weighting means are adapted to assign more weight for more recent events than for earlier events.

30. A bandwidth usage estimator as claimed in claim 25, comprising a lookup table, an arrangement being such that at least one parameter is fetched from the lookup table for the computations.

31. A bandwidth usage estimator as claimed in claim 30, wherein the at least one parameter is fetched from the lookup table based on relaxation time.

32. A bandwidth usage estimator as claimed in claim 30, wherein the at least one parameter is fetched based on information of past events.

33. A bandwidth usage estimator as claimed in claim 30, wherein the at least one parameter is fetched from a storage means based on a distance between two subsequent data packets.

34. A bandwidth usage estimator as claimed in claim 30, wherein the parameter to be fetched comprises a weight.

35. A bandwidth usage estimator as claimed in claim 30, wherein the at least one parameter is fetched based on a key value, said key value being based on a duration of the received data unit, duration of idle periods in the period and relaxation time.

36. A data communication system including a bandwidth usage estimator for estimating bandwidth used in a resource of the data communication system, wherein data units are communicated through said resource in data flow, comprising:
- means for computing a recent pulse density for the data flow over a period that includes a data unit and starts from a selected point in the flow;
- means for computing a weighted overall pulse density based on said computed recent pulse density and a previous overall pulse density computed earlier for the data flow;
- means for weighing the values of the computed recent pulse density and the previous overall pulse density relative to each other; and
- means for estimating the used bandwidth based on the weighted overall pulse density.

37. A data communication system, comprising: at least two bandwidth usage estimators for estimating bandwidth used in a resource of the data communication system, wherein data units are communicated through said resource in data flow, each bandwidth usage estimator includes:
- means for computing a recent pulse density for the data flow over a period that includes a data unit and starts from a selected point in the flow;
- means for computing a weighted overall pulse density based on said computed recent pulse density and a previous overall pulse density computed earlier for the data flow;
- means for weighing the values of the computed recent pulse density and the previous overall pulse density relative to each other; and
- means for estimating the used bandwidth based on the weighted overall pulse density.

38. A bandwidth usage estimator for estimating bandwidth used in a resource of a data communication system, wherein data units are communicated through said resource in data flow, comprising a data processing unit configured to:
- compute a recent pulse density for a data flow over a period that includes a data unit and starts from a selected point in the flow;
- compute a weighted overall pulse density based on said computed recent pulse density and a previous overall pulse density computed earlier for the data flow;
- weigh the values of the computed recent pulse density and the previous overall pulse density relative to each other; and
- estimate the used bandwidth based on the weighted overall pulse density.

* * * * *